United States Patent
Wu et al.

(10) Patent No.: US 10,886,990 B2
(45) Date of Patent: Jan. 5, 2021

(54) METHOD AND APPARATUS FOR FEEDING BACK CHANNEL STATE INFORMATION

(71) Applicant: HUAWEI TECHNOLOGIES CO., LTD., Guangdong (CN)

(72) Inventors: Ye Wu, Shanghai (CN); Wei Han, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/400,533

(22) Filed: May 1, 2019

(65) Prior Publication Data

US 2019/0260449 A1   Aug. 22, 2019

Related U.S. Application Data

(63) Continuation of application No. PCT/CN2017/108188, filed on Oct. 28, 2017.

(30) Foreign Application Priority Data

Nov. 4, 2016   (CN) .......................... 2016 1 0982332

(51) Int. Cl.
*H04B 7/06* (2006.01)
*H04L 5/00* (2006.01)
(Continued)

(52) U.S. Cl.
CPC ......... *H04B 7/0626* (2013.01); *H04L 1/0026* (2013.01); *H04L 1/0027* (2013.01);
(Continued)

(58) Field of Classification Search
CPC ... H04B 7/0626; H04L 1/0026; H04L 1/0027; H04L 5/00; H04L 5/0053; H04W 24/10
See application file for complete search history.

(56) References Cited

U.S. PATENT DOCUMENTS

| | | |
|---|---|---|
| 2009/0227258 A1 | 9/2009 | Youn et al. |
| 2009/0323851 A1 | 12/2009 | Ling et al. |

(Continued)

FOREIGN PATENT DOCUMENTS

| | | |
|---|---|---|
| CN | 1552132 A | 12/2004 |
| CN | 101621359 A | 1/2010 |

(Continued)

OTHER PUBLICATIONS

3GPP TS 36.213 V14.0.0 (Sep. 2016),3rd Generation Partnership Project;Technical Specification Group Radio Access Network;Evolved Universal Terrestrial Radio Access (E-UTRA);Physical layer procedures(Release 14),total 406 pages.

(Continued)

*Primary Examiner* — Ronald B Abelson
(74) *Attorney, Agent, or Firm* — Fish & Richardson P.C.

(57) ABSTRACT

Implementations of this application propose example methods and apparatuses for feeding back channel state information. In one example method applied to a wireless communications system, operations include receiving, by a user equipment, time configuration signaling and feedback configuration signaling, where the time configuration signaling is used to set a feedback time period and the feedback configuration signaling is used to configure one or more feedback cycles. The user equipment obtains and sends channel state information in one or more feedback cycles during the feedback time period.

12 Claims, 3 Drawing Sheets

(51) Int. Cl.
*H04L 1/00* (2006.01)
*H04W 24/10* (2009.01)

(52) U.S. Cl.
CPC .............. *H04L 5/00* (2013.01); *H04L 5/0053* (2013.01); *H04W 24/10* (2013.01)

(56) References Cited

U.S. PATENT DOCUMENTS

| | | |
|---|---|---|
| 2011/0242982 A1 | 10/2011 | Lunttila et al. |
| 2012/0147794 A1* | 6/2012 | Chung .................. H04W 24/10 |
| 2014/0086223 A1 | 3/2014 | Park et al. |
| 2015/0043452 A1 | 2/2015 | Li et al. |
| 2015/0208269 A1 | 7/2015 | Damnjanovic et al. |
| 2015/0223235 A1 | 8/2015 | Hwang et al. |

FOREIGN PATENT DOCUMENTS

| | | |
|---|---|---|
| CN | 101917259 A | 12/2010 |
| CN | 101960787 A | 1/2011 |
| CN | 102271031 A | 12/2011 |
| CN | 102347825 A | 2/2012 |
| CN | 102412941 A | 4/2012 |
| CN | 102780547 A | 11/2012 |
| CN | 102916785 A | 2/2013 |
| CN | 103107866 A | 5/2013 |
| CN | 103580810 A | 2/2014 |
| CN | 103905146 A | 7/2014 |
| CN | 104685955 A | 6/2015 |
| EP | 3471311 A1 | 4/2019 |

OTHER PUBLICATIONS

Office Action issued in Chinese Application No. 201810402707.3 dated Jan. 16, 2019, 8 pages.
Office Action issued in Chinese Application No. 201810402707.3 dated Apr. 17, 2019, 7 pages.
PCT International Search Report issued in International Application No. PCT/CN2017/108188 dated Jan. 9, 2018, 15 pages.
Office Action issued in Chinese Application No. 201811537401.5 dated Sep. 10, 2019, 9 pages.
Office Action issued in Chinese Application No. 201780067747.0 dated Dec. 26, 2019, 18 pages (with English translation).
Search Report issued in Chinese Application No. 201780067747.0 dated Dec. 18, 2019, 3 pages.
Extended European Search Report issued in European Application No. 17866677.2 dated Jul. 19, 2019, 10 pages.
R1-1609253—LG Electronics, "Views on CSI acquisition for NR," 3GPP TSG RAN WG1 Meeting #86b, Lisbon, Portugal, Oct. 10-14, 2016, 8 pages.
R1-168186—Samsung et al., "WF on periodic and semi-persistent CSI for NR," 3GPP TSG RAN WG1 Meeting #86, Gothenburg, Sweden, Aug. 22-26, 2016, 2 pages.

* cited by examiner

METHOD AND APPARATUS FOR FEEDING BACK CHANNEL STATE INFORMATION

CROSS-REFERENCE TO RELATED APPLICATIONS

This application is a continuation of International Application No. PCT/CN2017/108188, filed on Oct. 28, 2017, and claims priority to Chinese Patent Application No. 201610982332.3, filed on Nov. 4, 2016, The disclosures of the aforementioned applications are hereby incorporated by reference in their entireties.

TECHNICAL FIELD

This application relates to the field of communications technologies, and in particular, to a method and an apparatus for feeding back channel state information.

BACKGROUND

With extensive deployment of Long Term Evolution (LTE) networks, to meet a demand of a user for a wireless data service, development of a next-generation wireless communications system (5G) starts to be promoted in the industry. Measurement and reporting of channel state information (CSI) plays an extremely important role to an LTE system and a 5G system.

How to better feed back CSI becomes an urgent technical problem to be resolved.

SUMMARY

In view of this, a main objective of this application is to provide a method for periodically feeding back CSI in a feedback time period, to reduce system overheads through automatic feedback of UE.

According to one aspect, an embodiment of this application proposes a method for feeding back channel state information, applied to a wireless communications system, and including:

receiving, by user equipment, time configuration signaling and feedback configuration signaling, where the time configuration signaling is used to set a feedback time period, and the feedback configuration signaling is used to configure one or more feedback cycles; and periodically obtaining and sending, by the user equipment, CSI in one or more feedback cycles during the feedback time period.

In a possible design, the feedback cycle configuration includes an offset Z, and the user equipment feeds back the CSI in a corresponding transmission time unit that has an offset of Z transmission time units from a start transmission time unit of each feedback cycle, where Z is an integer greater than or equal to zero.

In a possible design, the feedback configuration signaling is used to configure N cycles, the CSI includes M parts, and the M parts are sent by using M cycles, where $N \geq M \geq 2$, and both N and M are positive integers.

In a possible design, the feedback cycle includes at least one or more transmission time units, the user equipment further receives data channel signaling, and the data channel signaling is used to indicate whether the user equipment is allowed to use an uplink data channel in one transmission time unit of the feedback cycle; and when the data channel signaling indicates that the uplink data channel is allowed to be used in the transmission time unit, the user equipment feeds back the CSI in the transmission time unit by using the uplink data channel.

According to another aspect, an embodiment of this application further proposes a method for feeding back channel state information, applied to a wireless communications system, and including:

generating and sending, by a base station, time configuration signaling and feedback configuration signaling, where the time configuration signaling is used to set a feedback time period, and the feedback configuration signaling is used to configure one or more feedback cycles; and receiving CSI periodically sent by user equipment in one or more feedback cycles during the feedback time period.

In a possible design, the feedback cycle configuration includes an offset Z, and the user equipment feeds back the CSI in a corresponding transmission time unit that has an offset of Z transmission time units from a start transmission time unit of each feedback cycle, where Z is an integer greater than or equal to zero.

In a possible design, the feedback configuration signaling is used to configure N cycles, the CSI includes M parts, and the M parts are sent by using M cycles, where $N \geq M \geq 2$, and both N and M are positive integers.

In a possible design, the feedback cycle includes at least one or more transmission time units, the base station further sends data channel signaling, and the data channel signaling is used to indicate whether the user equipment is allowed to use an uplink data channel in one transmission time unit of the feedback cycle; and when the data channel signaling indicates that the uplink data channel is allowed to be used in the transmission time unit, the user equipment feeds back the CSI in the transmission time unit by using the uplink data channel.

According to still another aspect, an implementation of this application further proposes an apparatus for feeding back channel state information, applied to a wireless communications system, and including:

a transceiver, configured to receive time configuration signaling and feedback configuration signaling, where the time configuration signaling is used to set a feedback time period, and the feedback configuration signaling is used to configure one or more feedback cycles; and a baseband processor, configured to obtain CSI in one or more feedback cycles during the feedback time period and send the CSI by using the transceiver.

In a possible design, the feedback cycle configuration includes an offset Z, and the user equipment feeds back the CSI in a corresponding transmission time unit that has an offset of Z transmission time units from a start transmission time unit of each feedback cycle, where Z is an integer greater than or equal to zero.

In another possible design, the feedback configuration signaling is used to configure N cycles, the CSI includes M parts, and the M parts are sent by using M cycles, where $N \geq M \geq 2$, and both N and M are positive integers.

In another possible design, the feedback cycle includes at least one or more transmission time units, the transceiver further receives data channel signaling, and the data channel signaling is used to indicate whether an uplink data channel is allowed to be used in one transmission time unit of the feedback cycle; and when the data channel signaling indicates that the uplink data channel is allowed to be used in the transmission time unit, the CSI is fed back in the transmission time unit by using the uplink data channel.

According to still another aspect, an embodiment of this application further proposes an apparatus for feeding back channel state information, applied to a wireless communications system, and including:

a baseband processing unit, configured to generate time configuration signaling and feedback configuration signaling, where the time configuration signaling is used to set a feedback time period, and the feedback configuration signaling is used to configure one or more feedback cycles; and the transceiver, configured to send the time configuration signaling and the feedback configuration signaling, and receive CSI periodically sent by user equipment in one or more feedback cycles during the feedback time period.

In a possible design, the feedback cycle configuration includes an offset Z, and the feedback configuration signaling is used to configure feeding back the CSI in a corresponding transmission time unit that has an offset of Z transmission time units from a start transmission time unit of each feedback cycle, where Z is an integer greater than or equal to zero.

In a possible design, the feedback configuration signaling is used to configure N cycles, the CSI includes M parts, and the M parts are sent by using M cycles, where N≥M≥2, and both N and M are positive integers.

In a possible design, the feedback cycle includes at least one or more transmission time units, the baseband processing unit further generates data channel signaling, and the data channel signaling is used to indicate whether the user equipment is allowed to use an uplink data channel in one transmission time unit of the feedback cycle; and when the data channel signaling indicates that the uplink data channel is allowed to be used in the transmission time unit, the CSI is fed back in the transmission time unit by using the uplink data channel.

According to the foregoing method for feeding back channel state information, the base station can dynamically control, based on a feedback demand of the UE, the UE to periodically feed back the CSI in a specified time, so as to improve feedback efficiency, and also reduce system overheads through automatic feedback of the UE.

BRIEF DESCRIPTION OF DRAWINGS

To describe the technical solutions in the embodiments of this application more clearly, the following briefly describes the accompanying drawings required for the embodiments of this application. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

It should be understood that, the technical solutions of the embodiments of this application can be applied to various communications systems, for example, a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD), a Universal Mobile Telecommunications System (UMTS), a Worldwide Interoperability for Microwave Access (WiMAX) communications system, a wireless local area network (WLAN), and a future fifth generation (5G) wireless communications system.

It should also be understood that in the embodiments of this application, a terminal device may be referred to as user equipment (UE), a mobile station (MS), a mobile terminal, or the like. The terminal device may communicate with one or more core networks by using a radio access network (RAN). For example, the terminal device may be a mobile phone (also referred to as a "cellular" phone) or a computer having a mobile terminal. For example, the terminal device may alternatively be a portable, pocket-sized, handheld, computer built-in, or in-vehicle mobile apparatus, which exchanges voice and/or data with the radio access network.

In the embodiments of this application, a base station may be a base transceiver station (BTS) in GSM or CDMA, or may be a NodeB ("NB" for short) in WCDMA, or may be an evolved NodeB ("eNB or e-NodeB" for short) in LTE, and a network side device in a future 5G network.

Figure 1:
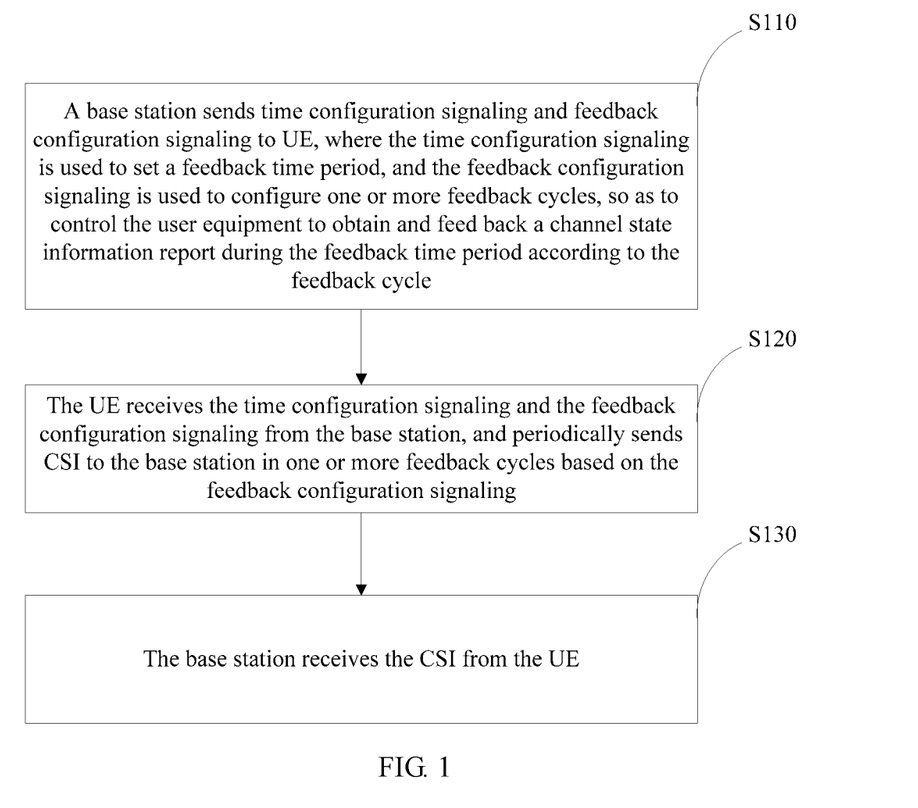
FIG. 1 is a schematic diagram of a method for feeding back channel state information according to an implementation of this application.

FIG. 1 shows a method for feeding back channel state information according to an implementation of this application. The method is interactively performed between a base station and one or more UEs. The communication method specifically includes the following steps:

S110. The base station sends time configuration signaling and feedback configuration signaling to the UE, where the time configuration signaling is used to set a feedback time period, and the feedback configuration signaling is used to configure one or more feedback cycles, so as to control the user equipment to obtain and feed back a channel state information report during the feedback time period according to the feedback cycle.

S120. The UE receives the time configuration signaling and the feedback configuration signaling from the base station, and periodically sends CSI to the base station in one or more feedback cycles based on the feedback configuration signaling. Specifically, the UE obtains and sends the CSI in the one or more feedback cycles, where the CSI may be generated through measurement in a previous transmission time unit, or may be generated through measurement in a current transmission time unit, or may be obtained through average measurement in a plurality of historical feedback cycles.

S130. The base station receives the CSI from the UE.

According to the foregoing method for feeding back channel state information, the base station can dynamically control, based on a feedback demand of the UE, the UE to periodically feed back the CSI in a specified time, so as to improve feedback efficiency, and reduce system overheads through automatic feedback of the UE.

In an example, the time configuration signaling and the feedback configuration signaling are carried in Radio Resource Control (Radio Resource Control, RRC) signaling for being sent, or carried in MAC-CE signaling for being sent, or may be carried in downlink control information (downlink control information, DCI) signaling for being sent.

Each feedback cycle includes a plurality of transmission time units, and each feedback cycle includes a start transmission time unit and an end transmission time unit. For example, the transmission time unit may be a subframe, or may be a transmission time interval (Transmission Time Interval, TTI).

Figure 2:
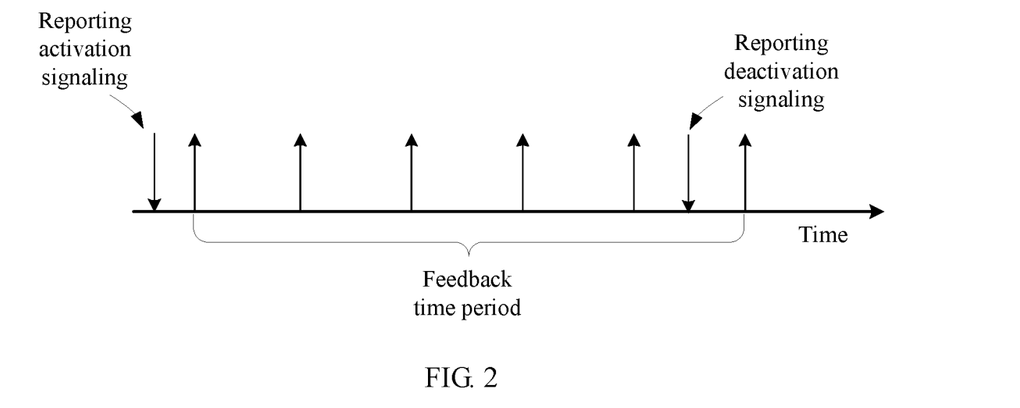
FIG. 2 is a schematic diagram of a feedback cycle according to an implementation of this application.

In an example, referring to FIG. 2, the foregoing time configuration signaling includes reporting activation signaling and reporting deactivation signaling. The reporting activation signaling is used to determine a start transmission time unit of the feedback time period, and the reporting deactivation signaling is used to determine an end transmission time unit of the feedback time period. The reporting activation signaling and the reporting deactivation signaling may be sent independently. That is, the base station sends the reporting activation signaling to the UE first, and the UE start to feed back a CSI report after receiving the reporting activation signaling; and when the base station sends the reporting deactivation signaling to the UE then, the UE stops feeding back the CSI report. Alternatively, the reporting activation signaling and the reporting deactivation signaling may be sent simultaneously. That is, when the UE receives the reporting activation signaling and the reporting deactivation signaling, a CSI report starts to be fed back at a moment indicated by the reporting activation signaling, and feedback of the CSI report stops at a moment indicated by the reporting deactivation signaling.

In another example, the foregoing time configuration signaling includes reporting activation signaling and reporting duration signaling. The reporting activation signaling is used to determine a start moment of the feedback time period, and reporting duration signaling is used to determine a consecutive transmission time unit in the feedback time period.

Figure 3:
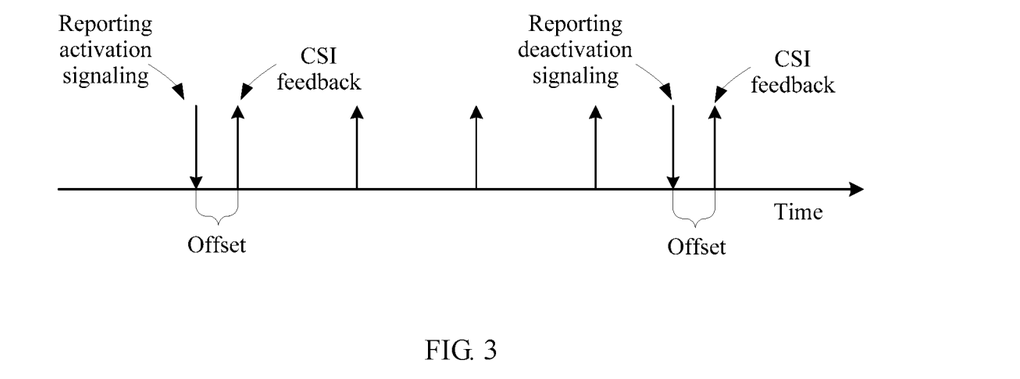
FIG. 3 is a schematic diagram of another feedback cycle according to an implementation of this application.

In still another example, referring to FIG. 3, the foregoing time configuration signaling is further used to configure a start delay or a stop delay, and start delays or stop delays of UEs may be the same or different. The start delay is used to control the user equipment to start CSI feedback after a delay of one or more transmission time units after receiving reporting activation signaling; the stop delay is used to control the user equipment to stop CSI feedback after a delay of one or more transmission time units after receiving reporting deactivation signaling or after duration indicated by delay offset signaling ends. Therefore, the start delay or the stop delay can reduce an error caused by a CSI feedback conflict.

In an example, the foregoing feedback configuration signaling includes an offset Z, and the user equipment feeds back the CSI in a corresponding transmission time unit that has an offset of Z transmission time units from a start transmission time unit of each feedback cycle, where Z is an integer greater than or equal to zero. For example, when Z=2, the user equipment feeds back the CSI in the second transmission time unit that is after a start transmission time unit of one cycle in the feedback time period. When there are a plurality of user equipments, the base station may set Z values of the user equipments, for example, set a Z value of UE1 to 2, and set a Z value of UE2 to 4, so as to avoid a conflict occurring in a process of feeding back the CSI by the UEs. That is, the user equipment feeds back an information state report at a moment that has an offset of Z TTIs from a start moment of a frame in the feedback time period.

In another example, one piece of CSI may be fed back in each feedback cycle. For example, one piece of CSI may include a channel quality indicator (CQI), a precoding matrix indication (PMI), and a rank indication (RI). The foregoing three indications are only used as examples, and are not used to limit CSI composition in this application.

Figure 4:
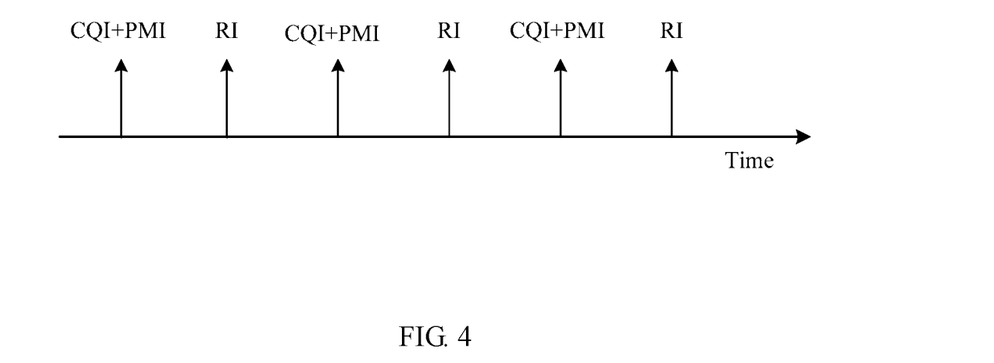
FIG. 4 is a schematic diagram of still another feedback cycle according to an implementation of this application.

Optionally, each piece of CSI may be further fed back in a plurality of feedback cycles. Specifically, the feedback configuration signaling is used to configure N cycles, the CSI includes M parts, and the M parts is sent by using M cycles, where N≥M≥2, and both N and M are positive integers. For example, the foregoing CSI may include two parts, and the two parts are any combination of a CQI, a PMI, and an RI. Referring to FIG. 4, when CSI is divided into a part that includes a CQI and a PMI and a part that includes an RI, in a process of feeding back the CSI, the CQI and the PMI are fed back in one cycle, and the RI is fed back in a next cycle; in other words, one complete CSI feedback is completed in two cycles. Therefore, when there is relatively much content in the CSI, the CSI can be consecutively fed back by using a plurality of cycles, so as to ensure timely CSI feedback.

In still another example, one feedback cycle includes a plurality of transmission time units, and the CSI is fed back in one of the transmission time units. For ease of description, the transmission time unit used to feed back the CSI is referred to as an effective time unit. The effective time unit is only used to indicate a transmission time unit used to feed back the CSI and is not used for limitation. For example, the transmission time unit may be a subframe, that is, the CSI is fed back in one subframe.

Optionally, the base station further sends data channel signaling to the UE, where the data channel signaling is used to indicate whether the CSI is allowed to be fed back in an effective time unit by using an uplink data channel (PUSCH). Specifically, when there is not only the uplink data channel (PUSCH), but also an uplink control channel (PUCCH) in the effective time unit, the data channel signaling is used to indicate whether the uplink data channel is allowed to be used. When the uplink data channel is allowed to be used in the effective time unit, the CSI is fed back by using the uplink data channel. When the uplink data channel is not allowed to be used in the effective time unit, the CSI is fed back by using the uplink control channel. For example, the data channel signaling may be carried by RRC signaling; when content of the data channel signaling is set to 1, it indicates that the uplink data channel is allowed to be used in the effective time unit; and when content of the data channel signaling is set to 0, it indicates that the uplink data channel is not allowed to be used in the effective time unit. Therefore, when there is an uplink data channel resource, the resource can be effectively used, so as to improve CSI feedback efficiency.

Figure 5:
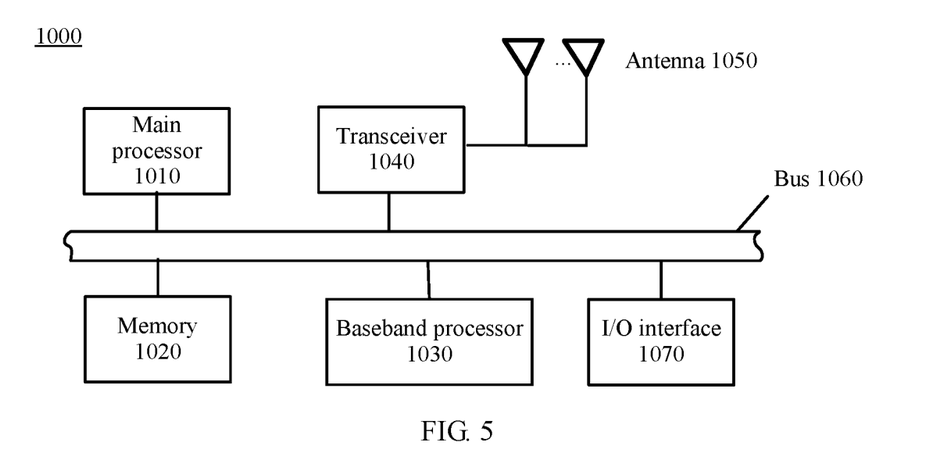
FIG. 5 is a simplified schematic structural diagram of an apparatus for feeding back channel state information according to an implementation of this application.

Another embodiment of this application provides an apparatus 1000 for feeding back channel state information that is applied to a wireless communications system. A solid structure of the apparatus 1000 is shown in FIG. 5. The apparatus 1000 may be a base station, or the apparatus 1000 may be an application-specific integrated circuit (Application-Specific Integrated Circuit, ASIC) or a chip for implementing a related function. The apparatus 1000 includes a processor 1010, a memory 1020, a baseband processor 1030, a transceiver 1040, an antenna 1050, a bus 1060, and an I/O interface 1070.

Specifically, the processor 1010 controls an operation of the apparatus 1000. The processor may be a general purpose processor, a digital signal processor, an application-specific integrated circuit, a field programmable gate array, or another programmable logic device. The memory 1020 may include a read-only memory and a random access memory, and provides an instruction and data to the processor 1010, where a part of the memory 1020 may further include a non-volatile random access memory (NVRAM).

The baseband processor 1030 is configured to generate a baseband signal (for example, time configuration signaling and feedback configuration signaling), or parse a received baseband signal to obtain useful information. The baseband processor includes a channel encoder and a modulator. The channel encoder can improve robustness of the baseband signal, overcome interference and fading in a wireless transmission environment, and reduce an error generated during transmission. The modulator may select an appropriate signal modulation manner based on the wireless transmission environment.

The transceiver 1040 includes a transmitter circuit and a receiver circuit. The transmitter circuit is configured to perform an up-conversion operation on the baseband signal generated by the baseband processor 1030, so as to obtain a high frequency carrier signal, and the high frequency carrier signal is transmitted by using the antenna 1050. The receiver circuit performs a down-conversion operation on the high frequency signal received by the antenna 1050, so as to obtain a low frequency baseband signal. There are one or more antennas 1050. The apparatus 1000 may further include the I/O interface 1070, and the I/O interface 1070 includes an input/output device such as a keyboard, an audio monitoring unit, and/or a touchscreen.

Components of the apparatus 1000 are coupled together by using a bus 1060. In addition to a data bus, the bus 1060 further includes a power bus, a control bus, and a status signal bus. However, for clear description, various types of buses in the figure are marked as the bus 1060. It should be noted that, the foregoing description of an access point structure can be applied to a subsequent embodiment.

The baseband processor 1030 is configured to generate the time configuration signaling and the feedback configuration signaling, where the time configuration signaling is used to set a feedback time period, and the feedback configuration signaling is used to configure one or more feedback cycles.

The transceiver 1040 is configured to: send the time configuration signaling and the feedback configuration signaling, and receive CSI periodically sent by user equipment in one or more feedback cycles during the feedback time period.

Optionally, the feedback cycle configuration includes an offset Z, and the feedback configuration signaling is used to configure that the CSI is fed back in a corresponding transmission time unit that has an offset of Z transmission time units from a start transmission time unit of each feedback cycle, where Z is an integer greater than or equal to zero.

Optionally, the feedback configuration signaling is used to configure N cycles, the CSI includes M parts, and the M parts are sent by using M cycles, where N≥M≥2, and both N and M are positive integers.

Optionally, the feedback cycle includes at least one or more transmission time units, and the baseband processor further generates data channel signaling, where the data channel signaling is used to indicate whether an uplink data channel is allowed to be used in one transmission time unit of the feedback cycle; and when the data channel signaling indicates that the uplink data channel is allowed to be used in the transmission time unit, the CSI is fed back in the transmission time unit by using the uplink data channel.

Figure 6:
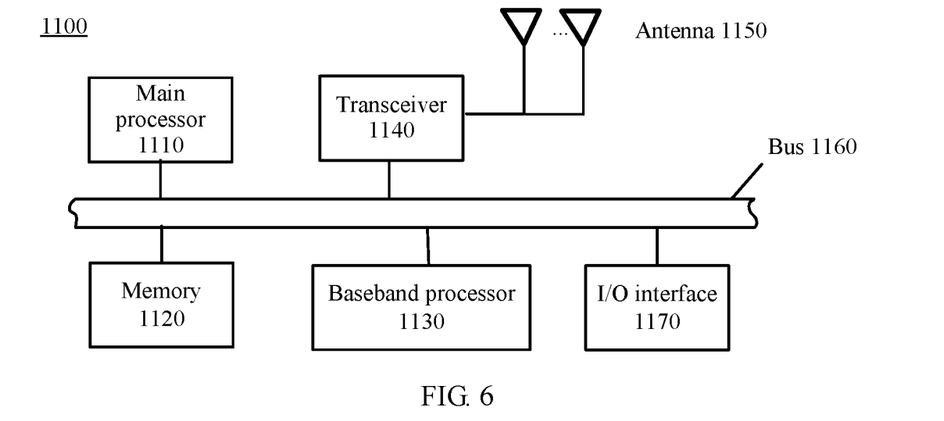
FIG. 6 is a simplified schematic structural diagram of another apparatus for feeding back channel state information according to an implementation of this application.

An embodiment of this application provides an apparatus for feeding back channel state information that is applied to a wireless communications system. A solid structure of the apparatus is shown in FIG. 6. The apparatus may be UE, or the apparatus may be an application-specific integrated circuit (English: Application-Specific Integrated Circuit, ASIC for short) or a chip for implementing a related function. The apparatus 1100 includes a processor 1110, a memory 1120, a baseband processor 1130, a transceiver 1140, an antenna 1150, a bus 1160, and an I/O interface 1170. Composition and a function of each component in the apparatus 1100 have been described in detail in the embodiment shown in FIG. 5, and are not described again.

The transceiver 1140 is configured to receive time configuration signaling and feedback configuration signaling, where the time configuration signaling is used to set a feedback time period, and the feedback configuration signaling is used to configure one or more feedback cycles.

The baseband processor 1130 is configured to periodically obtain and send CSI in one or more feedback cycles during the feedback time period.

Optionally, the feedback cycle configuration includes an offset Z, and the user equipment feeds back the CSI in a corresponding transmission time unit that has an offset of Z transmission time units from a start transmission time unit of each feedback cycle, where Z is an integer greater than or equal to zero.

Optionally, the feedback configuration signaling is used to configure N cycles, the CSI includes M parts, and the M parts are sent by using M cycles, where N≥M≥2, and both N and M are positive integers.

Optionally, the feedback cycle includes at least one or more transmission time units, where the transceiver further receives data channel signaling, where the data channel signaling is used to indicate whether an uplink data channel is allowed to be used in one transmission time unit of the feedback cycle; and when the data channel signaling indicates that the uplink data channel is allowed to be used in the transmission time unit, the baseband processor feeds back the CSI in the transmission time unit by using the uplink data channel and sends the CSI by using the transceiver.

The foregoing mainly describes the solutions provided by the embodiments of this application from a perspective of interaction between network elements. It can be understood that, to implement the foregoing functions, network elements, for example, UE, a base station, and a core network entity, include corresponding hardware structures and/or software modules for performing the functions. A person of ordinary skill in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

A controller/processor configured to perform functions of the base station, the terminal, or the core network apparatus in this application may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in this application. Alternatively, the processor may be a combination implementing a computing function, for example, a combination of one or more microprocessors, or a combination of the DSP and a microprocessor.

Method or algorithm steps described in combination with the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another place. The storage medium may be any available medium accessible to a general-purpose or dedicated computer.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A method applied to a wireless communications system, the method comprising:
   receiving, by a user equipment, time configuration signaling and feedback configuration signaling, wherein the time configuration signaling is used to set a feedback time period, and wherein the feedback configuration signaling is used to configure one or more feedback cycles; and
   periodically obtaining and sending, by the user equipment, channel state information (CSI) in one or more feedback cycles during the feedback time period;
   wherein the feedback configuration signaling comprises an offset Z, wherein the feedback configuration signaling is used to configure feeding back the CSI in a corresponding transmission time unit that has an offset of Z transmission time units from a start transmission time unit of each feedback cycle, and wherein Z is an integer greater than or equal to zero;
   wherein the feedback configuration signaling is used to configure N cycles, wherein the CSI comprises M parts, wherein the M parts are sent by using M cycles from the N cycles, wherein N≥M≥2, and wherein both N and M are positive integers.

2. The method according to claim 1, wherein the time configuration signaling comprises reporting activation signaling and reporting deactivation signaling.

3. The method according to claim 1, wherein the time configuration signaling is used to configure a start delay or a stop delay, wherein the start delay is used to configure the user equipment to start CSI feedback after a delay of one or more transmission time units after receiving reporting activation signaling, wherein the stop delay is used to configure the user equipment to stop CSI feedback after a delay of one or more transmission time units after receiving reporting deactivation signaling or after Z transmission time units offset from a start transmission time unit, and wherein Z is an integer greater than or equal to zero.

4. An apparatus applied to a wireless communications system, the apparatus comprising:
   a transceiver, the transceiver configured to receive time configuration signaling and feedback configuration signaling, wherein the time configuration signaling is used to set a feedback time period, and wherein the feedback configuration signaling is used to configure one or more feedback cycles; and
   at least one baseband processor, the at least one baseband processor configured to obtain channel state information (CSI) in one or more feedback cycles during the feedback time period and send the CSI by using the transceiver;
   wherein the feedback configuration signaling comprises an offset Z, wherein the feedback configuration signaling is used to configure feeding back the CSI in a corresponding transmission time unit that has an offset of Z transmission time units from a start transmission time unit of each feedback cycle, and wherein Z is an integer greater than or equal to zero;
   wherein the feedback configuration signaling is used to configure N cycles, wherein the CSI comprises M parts, wherein the M parts are sent by using M cycles from the N cycles, wherein N≥M≥2, and wherein both N and M are positive integers.

5. The apparatus according to claim 4, wherein the time configuration signaling comprises reporting activation signaling and reporting deactivation signaling.

6. The apparatus according to claim 4, wherein the time configuration signaling is used to configure a start delay or a stop delay, wherein the start delay is used to configure the apparatus to start CSI feedback after a delay of one or more transmission time units after receiving reporting activation signaling, wherein the stop delay is used to configure the apparatus to stop CSI feedback after a delay of one or more transmission time units after receiving reporting deactivation signaling or after Z transmission time units offset from a start transmission time unit, and wherein Z is an integer greater than or equal to zero.

7. An apparatus applied to a wireless communications system, the apparatus comprising:
   at least one baseband processor, the at least one baseband processor configured to generate time configuration signaling and feedback configuration signaling, wherein the time configuration signaling is used to set a feedback time period, and wherein the feedback configuration signaling is used to configure one or more feedback cycles; and a transceiver, the transceiver configured to:
send the time configuration signaling and the feedback configuration signaling; and
receive channel state information (CSI) periodically sent by user equipment in one or more feedback cycles during the feedback time period;
wherein the feedback configuration signaling comprises an offset Z, wherein the feedback configuration signaling is used to configure feeding back the CSI in a corresponding transmission time unit that has an offset of Z transmission time units from a start transmission time unit of each feedback cycle, and wherein Z is an integer greater than or equal to zero;
wherein the feedback configuration signaling is used to configure N cycles, wherein the CSI comprises M parts, wherein the M parts are sent by using M cycles from the N cycles, wherein N≥M≥2 and wherein both N and M are positive integers.

8. The apparatus according to claim 7, wherein the time configuration signaling comprises reporting activation signaling and reporting deactivation signaling.

9. The apparatus according to claim 7, wherein the time configuration signaling is used to configure a start delay or a stop delay, wherein the start delay is used to configure the user equipment to start CSI feedback after a delay of one or more transmission time units after receiving reporting activation signaling, wherein the stop delay is used to configure the user equipment to stop CSI feedback after a delay of one or more transmission time units after receiving reporting deactivation signaling or after Z transmission time units offset from a start transmission time unit, and wherein Z is an integer greater than or equal to zero.

10. A non-transitory computer readable storage medium, comprising an instruction, wherein when the instruction is run on a computer, the computer is enabled to perform:
receiving time configuration signaling and feedback configuration signaling, wherein the time configuration signaling is used to set a feedback time period, and the feedback configuration signaling is used to configure one or more feedback cycles; and
periodically obtaining and sending channel state information (CSI) in one or more feedback cycles during the feedback time period;
wherein the feedback configuration signaling comprises an offset Z, wherein the feedback configuration signaling is used to configure feeding back the CSI in a corresponding transmission time unit that has an offset of Z transmission time units from a start transmission time unit of each feedback cycle, and wherein Z is an integer greater than or equal to zero;
wherein the feedback configuration signaling is used to configure N cycles, wherein the CSI comprises M parts, wherein the M parts are sent by using M cycles from the N cycles, wherein N≥M≥2, and wherein both N and M are positive integers.

11. The computer readable storage medium according to claim 10, wherein the time configuration signaling comprises reporting activation signaling and reporting deactivation signaling.

12. The computer readable storage medium according to claim 10, wherein the time configuration signaling is used to configure a start delay or a stop delay, wherein the start delay is used to configure starting CSI feedback after a delay of one or more transmission time units after receiving reporting activation signaling, wherein the stop delay is used to configure stopping CSI feedback after a delay of one or more transmission time units after receiving reporting deactivation signaling or after Z transmission time units offset from a start transmission time unit, and wherein Z is an integer greater than or equal to zero.

* * * * *